June 3, 1941.  F. M. CLARK  2,244,387
DIELECTRIC COMPOSITION
Filed June 28, 1939
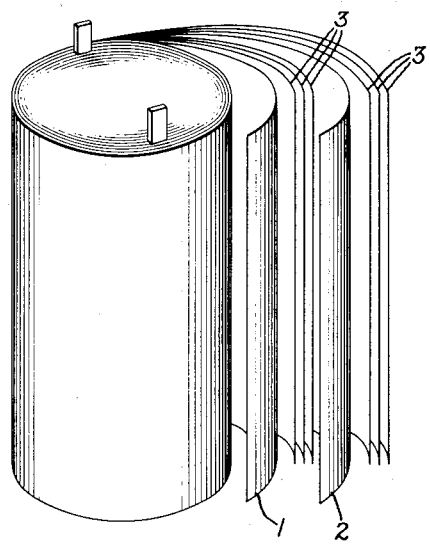
CONTAINS MIXTURE OF ALIPHATIC AND AROMATIC PHOSPHATES
Inventor:
Frank M. Clark,
by Harry E. Dunham
His Attorney.

Patented June 3, 1941

2,244,387

UNITED STATES PATENT OFFICE 2,244,387

DIELECTRIC COMPOSITION

Frank M. Clark, Pittsfield, Mass., assignor to General Electric Company, a corporation of New York Application June 28, 1939, Serial No. 281,635
In France March 31, 1939

3 Claims. (Cl. 252—63)

The present invention comprises improved treating or impregnating composition for dielectric use, and in particular for the electric capacitor field.

In my prior U. S. Patent No. 1,895,376, patented January 24, 1933, I have described electric capacitors impregnated with either tricresyl phosphate or tributyl phosphate. In another prior Patent 1,966,163, I have described capacitors impregnated either with designated organic phosphates which have been heat-treated to produce therein pyrogenic decomposition products, or with designated mixtures of organic products.

I have discovered that capacitors impregnated with mixture of ordinary or untreated aliphatic and aromatic phosphates in suitable proportions have an unexpectedly high capacity, low power factor and other desirable operating characteristics. The ester phosphates employed in accordance with my prior Patent 1,895,376, were treated to have a relatively high resistivity, commonly about 1.0 to $2.5 \times 10^9$ ohms per centimeter cube.

The dielectric compositions of my present invention, in which ordinary tributyl or other equivalent aliphatic phosphate, including the tripropyl or triethyl phosphates or mixed phosphate esters thereof such as the dibutyl monopropyl phosphate, constitutes a major proportion and ordinary tricresyl, or equivalent aromatic phosphate such as the triphenyl phosphate or trixenyl phosphate or mixed aromatic phosphates such as the monocresyl dixenyl phosphate, constitutes a minor proportion, have a resistivity within the limits of about $1 \times 10^6$ to $1 \times 10^8$ ohms per centimeter cube.

The accompanying drawing illustrates conventionally a roll-type capacitor embodying my invention.

A preferred impregnating composition made in accordance with my invention is a mixture consisting by weight of about one part of untreated or unmodified tricresyl phosphate to three parts of untreated or unmodified tributyl phosphate. This mixture has a resistivity of about 1 to $2.5 \times 10^7$ ohms per centimeter cube. Such a composition has a specific gravity at 15° C. of about 1.026, a viscosity at 37.8° C. of 38 to 40 seconds Saybolt, a pour point below 50° C. and a refractive index at 25° C. of 1.452.

In the fabrication of capacitors such as illustrated embodying my invention, capacitor armatures 1, 2 consisting of aluminum foil or other suitable material are assembled with two or three thicknesses of interposed kraft paper 3 which preferably have a thickness within a range of about .3 to 1 mil per sheet. The assembled aluminum foil and paper spacer ordinarily are wound in the usual well understood manner to form a roll, as illustrated but, of course, may assume other forms. It should be noted that the armatures are assembled with the paper in their original untreated or unformed state. The assembly is impregnated with a composition of the present invention by vacuum treatment or immersion as is well understood. The penetration preferably is accelerated by heating the composition to an elevated temperature varying with conditions from room temperature to about 120° C. The impregnated assembly is put into suitable containers which are sealed and provided, as usual, with external terminals.

For the same cubical content, capacitors impregnated with the improved compositions herein described possess capacities about double the capacity of otherwise similar condensers impregnated with tricresyl phosphate in accordance with my prior patent. Capacitors embodying my invention have capacities about three times higher than similar capacitors impregnated with mineral oil.

At 25° C., capacitors impregnated with improved compositions of this invention have a power factor of about 3 per cent at 60 cycle operation. At temperatures materially above 25° C. and up to about 75° C., the power factor is maintained at about 3 per cent, or falls to lower values. This characteristic renders such capacitors particularly suitable for continuous operation and for mounting on or close to electric devices, which, by their operation, raise the temperature of the environment materially above room temperature.

The dielectric strength of kraft paper impregnated with mixtures of tributyl and tricresyl phosphate is high and, therefore, capacitors embodying such impregnated paper are suited for operation at commercial voltages. They are satisfactory for continuous operation at voltages of the order of 110 to 220 volts and, for intermittent service, can be used in circuits of materially higher voltage. Three sheets of 4 mil kraft paper impregnated with the above preferred mixture have a dielectric strength of about 2250 volts per mil.

Capacitors containing five sheets of such impregnated kraft paper can withstand voltages exceeding 4000 volts without breakdown.

Capacitors embodying my invention are characterized by having stable characteristics over long periods of operation. They have been found to be particularly suitable for operation in alternating current circuits containing fluorescent lamps to be used both for starting such lamps and for continuous operation therewith.

What I claim as new and desire to secure by Letters Patent of the United States is:

1. A liquid dielectric composition of matter consisting essentially of a major proportion of unmodified aliphatic phosphate and a minor proportion of unmodified aromatic phosphate having a resistivity within the limits of about $1 \times 10^6$ to $1 \times 10^8$ ohms per centimeter cube.

2. A liquid dielectric composition consisting essentially of a major proportion of unmodified tributyl phosphate and a minor proportion of unmodified tricresyl phosphate, said composition having a resistivity within a range of about $1 \times 10^6$ to $1 \times 10^8$ ohms per centimeter cube.

3. A liquid dielectric composition consisting essentially of by weight about three parts of unmodified tributyl phosphate and about one part of unmodified tricresyl phosphate.

FRANK M. CLARK.